3,015,678
PRODUCTION OF MONOCHLORBUTENES
Frank Christopher Newman, Great Bookham, England, assignor to The Distillers Company Limited, Edinburgh, Scotland, a British company
No Drawing. Filed June 23, 1959, Ser. No. 822,182
Claims priority, application Great Britain July 11, 1958
9 Claims. (Cl. 260—652.5)

The present invention relates to the stabilisation of monochlorbutenes.

The manufacture of monochlorbutenes by substitutive chlorination of n-butene-1 and n-butene-2 in the vapour phase is well known. A mixture of monochlorbutenes is produced consisting mainly of 3-chlorbutene-1 and 1-chlorbutene-2. After chlorination, the reactants are usually condensed, transferred to a kettle and the monochlorbutenes distilled off. Owing to the readiness with which the monochlorbutenes polymerise, in the presence of traces of metals such as iron, resulting in loss of monochlorbutenes and formation of unwanted dimers, trimers and more highly polymerised material, and blockage of the distillation column, it has hitherto been necessary to use reaction vessels and recovery apparatus manufactured from special and costly non-ferruginous materials, such as nickel, plastic or glass. Furthermore, for the same reasons in general it is not possible to use cheap steel containers for the storage of monochlorbutenes. It has been suggested to inhibit this polymerisation by the addition of small amounts of water but this gives rise to serious corrosion problems.

It is an object of the present invention to provide a process for the stabilisation of monochlorbutenes, in which the formation of polymeric material catalysed by traces of metals such as iron, is appreciably reduced, and which therefore enables steel equipment to be used in the preparation and storage of monochlorbutenes. It is also an object to provide a stabilised composition comprising one or more monochlorbutenes.

According to the present invention, the process for the stabilisation of a monochlorbutene or mixture of monochlorbutenes comprises incorporating with the monochlorbutene one or more organic sulphur compounds of the kind described below.

The invention also comprises a monochlorbutene stabilised by one or more organic sulphur compounds of the kind described.

The process of the present invention is particularly applicable to the stabilisation of 3-chlorbutene-1 and 1-chlorbutene-2 produced by the substitutive chlorination of n-butene.

The presence of the organic sulphur compound inhibits the formation of polymeric material and consequently problems associated with loss of yield and formation of unwanted materials are substantially eliminated.

The organic sulphur compounds, hereinafter referred to as inhibitors, which may be used in the process of the present invention are organic sulphur compounds containing a divalent sulphur atom attached by one of its valencies to a carbon atom, and attached by the second of its valencies to a carbon atom or to a hydrogen atom. Suitable compounds covered by this definition include mercaptans such as methyl, ethyl, propyl, isopropyl, butyl, amyl, hexyl, dodecyl and benzyl mercaptans, substituted mercaptans such as thioglycollic acid and mercaptobenzothiazole, and compounds such as thio-diphenylamine.

The organic sulphur compound may be added to the monochlorbutenes as such, or in the form of a solution in the monochlorbutenes themselves, or in the form of a solution in an inert solvent such as xylene. It is preferred to add the inhibitor in solution in an inert solvent such as xylene.

The concentration of added inhibitor is not critical and may vary within wide limits, depending on the amount of trace metal present. In general concentrations of inhibitor between 0.01 and 1% by weight, based on the monochlorbutene, are suitable. In a preferred embodiment of the process of the present invention the reaction product of the substitutive chlorination of n-butene is distilled in the presence of an organic sulphur-containing compound as defined above, to recover the monochlorbutenes as an overhead fraction. In this embodiment it is preferred to use an inhibitor of boiling point the same as or lower than the boiling point of the monochlorbutenes, for example isopropyl mercaptan, and to add the inhibitor to the feed to the distillation column, so that it is taken along with the monochlorbutene fraction to storage. The concomitant use of a second inhibitor of higher boiling point than the boiling point of the monochlorbutenes, for example mercaptobenzothiazole, thio-diphenylamine, dodecyl mercaptan or benzyl mercaptan, ensures that a protective action takes place throughout the kettle and lower part of the distillation column. Alternatively, the inhibitor may be added to the vessel in which the monochlorbutenes are collected or stored.

The following examples are given further to illustrate the process of the invention.

EXAMPLE 1

Varying amounts of ferric chloride were added to standard test samples of monochlorbutene (a mixture consisting mainly of 3-chlorbutene-1 and 1-chlorbutene-2), together with an inhibitor. The ferric chloride was added to simulate the effect on the monochlorbutenes of steel apparatus. Ferric chloride is a well-known polymerisation catalyst of the Friedel-Crafts type. The samples were then heated at 66° C. for three hours and distilled from a boiling water-bath for 30 minutes, when no more distillate came over. The weight of residue left in the reaction vessel was taken as a measure of the extent of polymerisation. The results are shown in Table 1.

By way of comparison with this example, when other polymerisation inhibitors, e.g. water, hydroquinone and anisole, were used, or when no inhibitor was included, it is seen that considerable polymerisation took place.

Table 1

| Inhibitor | Inhibitor Concentration, Percent | Iron (parts per million) | Percent Residue |
|---|---|---|---|
| None | | 0 | 1.0 |
| None | | 8 | 8.1 |
| None | | 16 | 14.2 |
| None | | 33 | 22.8 |
| None | | 64 | 29.7 |
| Thio-diphenylamine | 0.1 | 33 | 3.3 |
| Butyl mercaptan | 0.09 | 33 | 3.9 |
| Thioglycollic acid | 0.1 | 33 | 5.0 |
| Hydroquinone | 0.1 | 33 | 19.1 |
| Anisole | 0.1 | 33 | 19.5 |
| Water | 0.1 | 33 | 22.9 |

EXAMPLE 2

Similar processes were carried out as described in Example 1. For this series of tests, the monochlorbutenes were treated with 26 parts per million of iron in the form of ferric chloride, and an appropriate inhibitor. The results are shown in Table 2. By way of comparison with this example, t-butyl catechol, a well-known polymerisation inhibitor, was relatively ineffective.

*Table 2*

| Inhibitor | Inhibitor Concentration, Percent | Residue, Percent |
|---|---|---|
| None | | 14.5 |
| Thio-diphenylamine | 0.1 | 2.1 |
| Do | 0.025 | 2.4 |
| Do | 0.01 | 5.1 |
| Mercaptobenzothiazole | 0.1 | 2.4 |
| t-butyl catechol | 0.1 | 11.1 |

EXAMPLE 3

A sample of freshly distilled monochlorbutene, to which had been added 70 parts per million of isopropyl mercaptan and 70 parts per million of thio-diphenylamine was stored in a tank of stainless steel. After 7 days' storage, the iron content had risen to 51 parts per million, but no polymeric material was detectable. After 14 days' storage, a maximum of 0.4% polymeric material was present.

By way of comparison with this example a similar sample of freshly distilled monochlorbutene containing no organic sulphur compound was stored in a tank of stainless steel for a period of 2 days. After this period, analysis of the monochlorbutene showed that 8 parts per million of iron were present. After a total of 9 days' storage, analysis of the monochlorbutene showed the presence of 9.6% of polymeric material.

EXAMPLE 4

A mixture of monochlorbutenes, dichlorbutenes and dichlorbutanes together with high boiling compounds and other minor constituents, obtained by the chlorination of butadiene in the presence of butene-2 was fed continuously at a rate of about 15 lbs./hr. to a 3 in. diameter stainless steel fractionating column packed with Raschig rings. Benzyl mercaptan and isopropyl mercaptan were added to the feed at a rate of 0.5 g. per hour. After 1057 hours' operation only minor amounts of polymer were found in the column.

By way of comparison with this example, a similar distillation was carried out in which the mercaptan inhibitors were omitted from the feed. After only 127 hours' operation polymer formation caused a blockage at the feed section of the column.

I claim:

1. A monochlorbutene, selected from the group consisting of 3-chlorbutene-1 and 1-chlorbutene-2 and mixtures thereof, stabilized against metal-induced polymerization, by at least one organic sulphur compound containing a divalent sulphur atom attached by one of its valencies to a carbon atom, and attached by the second of its valencies to an atom selected from the group consisting of carbon and hydrogen atoms.

2. A stabilized monochlorbutene as claimed in claim 1 wherein the organic sulphur compound is selected from the group consisting of methyl, ethyl, propyl, isopropyl, butyl, amyl, hexyl, dodecyl and benzyl mercaptans, thioglycollic acid, mercapto-benzothiazole, and thio-diphenylamine.

3. A stabilized monochlorbutene as claimed in claim 1 wherein the concentration of organic sulphur compound is between 0.01 and 1% by weight, based on the weight of monochlorbutene.

4. A process for the recovery of a monochlorbutene, selected from the group consisting of 3-chlorbutene-1 and 1-chlorbutene-2 and mixtures thereof, from the reaction product of the substitutive chlorination of n-butene, which comprises fractionally distilling the reaction product in the presence of at least one organic sulphur compound containing a divalent sulphur atom attached by one of its valencies to a carbon atom, and attached by the second of its valencies to an atom selected from the group consisting of carbon and hydrogen atoms, and taking off the monochlorbutene as an overhead fraction.

5. The process as claimed in claim 4 wherein the fractional distillation is carried out in the presence of a first organic sulphur compound having a boiling point the same as or lower than the boiling point of the monochlorbutene together with a second organic sulphur compound having a boiling point higher than the boiling point of the monochlorbutene.

6. The process as claimed in claim 5 wherein the first organic sulphur compound is isopropyl mercaptan and the second organic sulphur compound is selected from the group consisting of dodecyl mercaptan, benzyl mercaptan, thiodephenylamine and mercapto-benzothiazole.

7. The process for the recovery of a monochlorbutene, selected from the group consisting of 3-chlorbutene-1 and 1-chlorbutene-2 and mixtures thereof, from the reaction product of the substitutive chlorination of n-butene, which comprises fractionally distilling the reaction product in the presence of least one organic sulphur compound selected from the group consisting of methyl, ethyl, propyl, isopropyl, butyl, amyl, hexyl, dodecyl and benzyl mercaptans, thioglycollic acid, mercapto-benzothiazole, and thio-diphenylamine, and taking off the monochlorbutene as an overhead fraction.

8. A process for the stabilization of a monochlorbutene, selected from the group consisting of 3-chlorbutene-1 and 1-chlorbutene-2 and mixtures thereof, which comprises incorporating therewith at least one organic sulphur compound containing a divalent sulphur atom attached by one of its valencies to a carbon atom, and attached by the second of its valencies to an atom selected from the group consisting of carbon and hydrogen atoms.

9. A monochlorbutene, selected from the group consisting of 3-chlorbutene-1 and 1-chlorbutene-2 and mixtures thereof, stabilized in the presence of iron by at least one organic sulphur compound containing a divalent sulphur atom attached by one of its valencies to a carbon atom, and attached by the second of its valencies to an atom selected from the group consisting of carbon and hydrogen atoms.

References Cited in the file of this patent

UNITED STATES PATENTS

| | | |
|---|---|---|
| 1,950,438 | Carothers et al. | Mar. 13, 1934 |
| 2,136,334 | Coleman et al. | Nov. 8, 1938 |
| 2,376,075 | Morris et al. | May 15, 1945 |
| 2,407,149 | Gardenier | Sept. 3, 1946 |
| 2,407,396 | Brubaker | Sept. 10, 1946 |
| 2,407,405 | Dietrich et al. | Sept. 10, 1946 |